US012532081B2

(12) United States Patent
Jamin et al.

(10) Patent No.: US 12,532,081 B2
(45) Date of Patent: Jan. 20, 2026

(54) COLOUR AND TIME-OF-FLIGHT PIXEL PATTERN FOR AN IMAGE SENSOR

(71) Applicant: Commissariat à l'Énergie Atomique et aux Énergies Alternatives, Paris (FR)

(72) Inventors: Clémence Jamin, Grenoble (FR); Jérôme Vaillant, Grenoble (FR); Alexis Rochas, Grenoble (FR); Yvon Cazaux, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 324 days.

(21) Appl. No.: 18/281,944

(22) PCT Filed: Mar. 7, 2022

(86) PCT No.: PCT/EP2022/055724
§ 371 (c)(1),
(2) Date: Sep. 13, 2023

(87) PCT Pub. No.: WO2022/194594
PCT Pub. Date: Sep. 22, 2022

(65) Prior Publication Data
US 2024/0187745 A1 Jun. 6, 2024

(30) Foreign Application Priority Data
Mar. 16, 2021 (FR) ........................ 2102581

(51) Int. Cl.
*H04N 23/84* (2023.01)
*H04N 25/11* (2023.01)

(52) U.S. Cl.
CPC ............. *H04N 23/84* (2023.01); *H04N 25/11* (2023.01)

(58) Field of Classification Search
USPC ......................................... 382/162
See application file for complete search history.

(56) References Cited

U.S. PATENT DOCUMENTS

| 2004/0169749 A1 | 9/2004 | Acharya |
| 2011/0085063 A1 | 4/2011 | Min et al. |
| 2012/0182394 A1 | 7/2012 | Bae et al. |
| 2012/0293696 A1* | 11/2012 | Tanaka ................. H04N 23/843 348/E9.002 |
| 2015/0181187 A1 | 6/2015 | Wu et al. |
| 2017/0111618 A1 | 4/2017 | Hsieh et al. |

OTHER PUBLICATIONS

International Preliminary Report on Patentability dated Sep. 12, 2023 for International Application No. PCT/EP2022/055724.
International Search Report and Written Opinion for International Application No. PCT/EP2022/055724, mailed Jul. 4, 2022.

* cited by examiner

*Primary Examiner* — Jacky X Zheng
(74) *Attorney, Agent, or Firm* — Wolf, Greenfield & Sacks, P.C.

(57) ABSTRACT

An image sensor including a plurality of pixels divided into elementary groups, each elementary group including a plurality of adjacent pixels arranged in a matrix, in rows and columns, each elementary group including first pixels, second and third visible image pixels sensitive in different wavelength ranges and fourth depth image pixels, wherein each row of each elementary group includes at least a fourth pixel.

9 Claims, 4 Drawing Sheets

| PIX | G | Z | R | B | G |
|---|---|---|---|---|---|
| | B | G | G | Z | R |
| PIX | Z | R | B | G | G |
| | G | G | Z | R | B |
| | R | B | G | G | Z |

| PIX | G | B | Z | G | R |
|---|---|---|---|---|---|
| | Z | G | R | G | B |
| PIX | R | G | B | Z | G |
| | B | Z | G | R | G |
| | G | R | G | B | Z |

COLOUR AND TIME-OF-FLIGHT PIXEL PATTERN FOR AN IMAGE SENSOR

This application is a national stage filing under 35 U.S.C. § 371 of International Patent Application Serial No. PCT/EP2022/055724, filed Mar. 7, 2022, which claims priority to French patent application 21/02581, filed Mar. 16, 2021. The contents of these applications are incorporated herein by reference in their entirety.

TECHNICAL FIELD

The present disclosure relates generally to the field of image acquisition devices. The present disclosure relates more particularly to image acquisition devices suitable for acquiring a 2D image and a depth image of a scene.

BACKGROUND ART

Image acquisition devices apt to acquire a 2D image and a depth image of a scene are known. In particular, devices including 2D image pixels and depth pixels integrated into a photodetector array of the same image sensor, are known. Examples of such devices are described in particular in patent applications US2018167606 and US2019191067 previously filed by the applicant.

SUMMARY OF INVENTION

There is a need to improve the existing acquisition devices of a 2D image and of a depth image of a scene. In particular, it would be desirable to produce an image sensor which would integrate, within a same photodetector array, 2D image pixels and depth pixels, the sensor having, for the acquisition of 2D images and of depth images, colorimetric performances and reduced artifacts compared with known sensors.

The subject matter of one embodiment is to address all or some of the drawbacks of known acquisition devices of a 2D image and of a depth image of a scene.

For this purpose, one embodiment provides an image sensor comprising a plurality of pixels distributed in elementary groups, each elementary group consisting of a plurality of adjacent pixels arranged in a matrix according to rows and columns, each elementary group including first, second and third visible image pixels sensitive in different wavelength ranges and fourth depth image pixels, wherein each row of each elementary group comprises at least a fourth pixel.

According to one embodiment, each column of each elementary group comprises at least a fourth pixel.

According to one embodiment, the first and second pixels are chrominance pixels and the third pixels are luminance pixels.

According to one embodiment, the first pixels are predominantly sensitive to red light and the second pixels are predominantly sensitive to blue light.

According to one embodiment, the third pixels are predominantly sensitive to green light.

According to one embodiment, the third pixels include pixels of a first type and pixels of a second type, which are sensitive to different wavelength ranges.

According to one embodiment, the third pixels of the first type are predominantly sensitive to green light and the third pixels of the second type are predominantly sensitive to white, yellow or emerald-green light.

According to one embodiment, within each group of pixels, all the rows and all the columns have a same number of third pixels of the first type and of third pixels of the second type.

According to one embodiment, within each elementary group, all the rows and all the columns have a same number of first pixels and a same number of second pixels.

According to one embodiment, within each elementary group, each row includes two to four times more third pixels than first pixels.

According to one embodiment, within each elementary group, each column includes two to four times more third pixels than second pixels.

According to one embodiment, within each elementary group, each row and each column includes as many second pixels as first pixels.

According to one embodiment, within each elementary group, each row and each column includes as many fourth pixels as second pixels.

According to one embodiment, the fourth pixels are pixels for measuring distance by time-of-flight.

One embodiment provides for an image sensor comprising a plurality of pixels distributed in elementary groups of 5×5 pixels, each elementary group consisting of a plurality of adjacent pixels arranged in a matrix according to rows and columns, each row and each column of each elementary group including exactly:
 a first visible image pixel predominantly sensitive to red light;
 a second visible image pixel predominantly sensitive to blue light;
 two third luminance pixels; and
 a fourth depth image pixel.

BRIEF DESCRIPTION OF DRAWINGS

The foregoing features and advantages, as well as others, will be described in detail in the following description of specific embodiments given by way of illustration and not limiting with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. More particularly, the production of the photodiodes and of the control circuits of the 2D image pixels and of the depth pixels has not been discussed in detail, since a person skilled in the art would know how to produce such pixels, on the basis of the indications of the present description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferentially within 5%.

Figures 1, 2, 3:
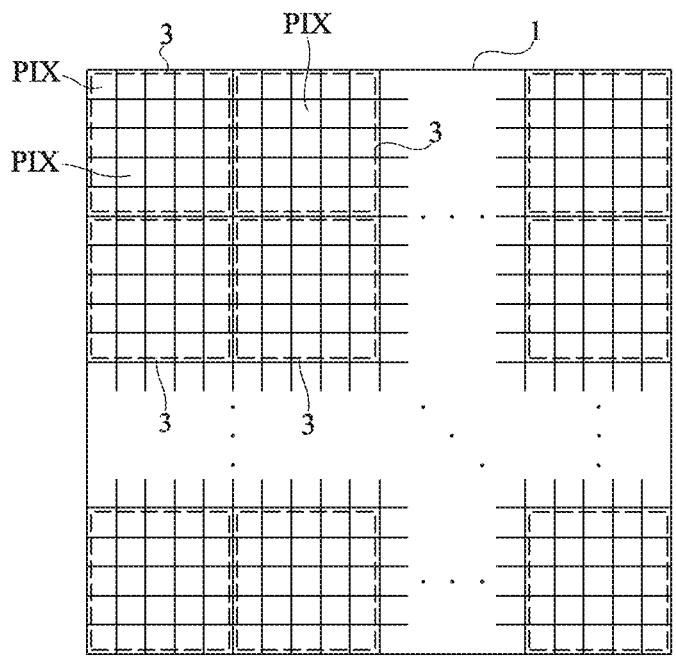
FIG. 1 is a top view schematically and partially illustrating an example of an embodiment of a sensor for 2D images and depth images.
FIG. 2 is a top view schematically illustrating an example of an elementary group of pixels of the image sensor of FIG. 1.
FIG. 3 is a top view schematically illustrating another embodiment of the elementary group of pixels of the image sensor of FIG. 1.

FIG. 1 is a top view schematically and partially illustrating an example of an embodiment of an image sensor 1.

In the example shown, the sensor 1 comprises a plurality of pixels PIX. In the present example, the pixels PIX are arranged in a matrix, in rows and in columns. The rows are e.g. substantially perpendicular to the columns. Each row of pixels PIX of the sensor 1 corresponds e.g. to a horizontal row, in the orientation of FIG. 1, of adjacent pixels PIX. Each column of pixels PIX of sensor 1 corresponds e.g. to a vertical row, in the orientation of FIG. 1, of adjacent pixels PIX.

The pixels PIX of the sensor 1 each have e.g. a substantially square shape, as illustrated in FIG. 1. All the pixels PIX have e.g. identical lateral dimensions, within manufacturing dispersions.

The image sensor 1 comprises, among the PIX pixels of the matrix, 2D image pixels or visible image pixels. The 2D image pixels are e.g. suitable for capturing visible light coming from a scene, so as to form a two-dimensional image of the scene. In the case where the image sensor 1 is suitable for capturing 2D color images, the 2D image pixels are e.g. of different types, e.g. suitable for measuring light intensities in different wavelength ranges. For example, each 2D image pixel includes a color band-pass filter, e.g. predominantly transmitting green, red or blue radiation depending on the wavelength range of the pixel.

Among the pixels PIX, the image sensor 1 comprises, in addition to the 2D image pixels, depth pixels. The depth pixels are e.g. suitable for estimating distances between the sensor 1 and points of the scene. A depth image or depth map of the scene can thereby be formed. Each depth pixel includes e.g. a depth band-pass filter, e.g. transmitting radiation predominantly in the near infrared. For example, each depth pixel has a filter structure with a maximum transmittance for a wavelength of about 850, 905 or 940 nm and a spectral width (full-width-at-half-maximum of the transmission band) comprised between 20 and 30 nm.

The sensor 1 is e.g. intended for being used in combination with a light source, e.g. a laser source, emitting light at a determined wavelength or in a determined wavelength range. The range of emission wavelengths of the light source is e.g. outside the visible range, e.g. in the near infrared range, e.g. in the range from 700 to 1,000 nm. For example, when the depth filter has a maximum transmittance for a wavelength of about 940 nm, the source has a range of emission wavelengths centered on about 940 nm and having a full width at half maximum of less than 3 nm.

In operation, the light signal produced by the light source is emitted towards the scene, e.g. in the form of light pulses, e.g. periodic pulses. The return light signal reflected by the scene is picked up by the depth pixels of the image sensor 1, e.g. so as to measure the time-of-flight of the light signal at different points of the scene, which is used for estimating the distance of such points with respect to the image sensor 1. As a variant, the light signal produced by the light source could form a structured light pattern. The return light signal reflected by the scene is picked up by the depth pixels of the image sensor 1. An analysis of the deformations of the pattern by the scene is used for determining depth information.

For example, the depth image of the scene can be combined with the 2D image of the same scene. Combinations of the above type can be used in applications such as facial recognition, virtual or augmented reality, autonomous vehicle driving, etc.

In FIG. 1, the 2D image pixels and the depth pixels of the image sensor 1 are not differentiated.

In the example shown, the pixels PIX of the sensor 1 are divided into elementary groups 3. In the present example, each pixel PIX belongs to only one elementary group 3. The elementary groups 3 of the sensor 1 each consist of a plurality of adjacent pixels PIX, i.e. two pixels PIX belonging to the same elementary group 3 are not separated by one or a plurality of pixels PIX belonging to another elementary group 3. Within each elementary group 3, the pixels PIX are arranged in a matrix, in rows and in columns.

Each elementary group 3 defines, in top view, an elementary mosaic pattern corresponding to the smallest set of pixels PIX from which it is possible to reconstruct, by horizontal and vertical translations of the pattern, the arrangement of all the pixels PIX of the matrix of the sensor 1. The elementary groups 3 of the sensor 1 are e.g. identical to each other, within manufacturing dispersions. In particular, all the elementary groups 3 of the sensor 1 have the same number of pixels PIX. Furthermore, all the elementary groups 3 have the same number of 2D image pixels and the same number of depth pixels. The 2D image pixels and the depth pixels are e.g. arranged with respect to each other in an identical way for all the elementary groups 3 of the sensor 1.

Each elementary group 3 includes e.g. a Color and Depth Filter Array (CDFA). The color and depth filter array of each elementary group 3 forms e.g. the smallest pattern from which it is possible to reconstruct, by translations of the pattern, the arrangement of color filters and depth filters of the entire matrix of pixels PIX of the sensor 1.

FIG. 2 is a top view schematically illustrating, an embodiment of the elementary group 3 of pixels PIX of the image sensor 1 of FIG. 1.

In the example shown, the elementary group 3 includes 2D image pixels of different types and depth pixels. More precisely, in the present example, the elementary group 3 includes:

2D R image pixels, e.g. predominantly sensitive to red light;

other 2D G image pixels, e.g. predominantly sensitive to green light;

further other 2D B image pixels, e.g. predominantly sensitive to blue light; and depth Z pixels, e.g. Predominantly sensitive to infrared light.

In the example shown, the elementary group 3 includes twenty-five pixels PIX divided into five rows and five columns.

According to one embodiment, each row of the elementary group 3 includes at least one depth Z pixel. The fact that each row comprises at least one depth Z pixel reduces the presence of artifacts in the visible 2D image. Furthermore, each column of the elementary group 3 preferentially includes at least one depth Z pixel. In the example shown, each row of pixels PIX of the elementary group 3 comprises only one depth Z pixel. Moreover, in such example, each column of pixels PIX of the elementary group 3 comprises only one depth Z pixel.

In the example shown, the rows of pixels PIX of the elementary group 3 all have as many Z pixels as B pixels. Furthermore, in said example, all the columns of pixels PIX of the elementary group 3 have as many Z pixels as B pixels.

In the example illustrated in FIG. 2, the rows of pixels PIX of the elementary group 3 all have the same number of R pixels and the same number of B pixels. Furthermore, in said example, all the columns of pixels PIX of the elementary group 3 have the same number of R pixels and the same number of B pixels. The number of R pixels and the number of B pixels in each row are e.g. equal to the number of R pixels and to the number of B pixels, respectively, in each column. In the example shown, each row of pixels PIX of the elementary group 3 comprises as many R pixels as B pixels. In addition, in said example, each column of pixels PIX of the elementary group 3 comprises as many R pixels as B pixels. The fact that each row and each column comprises at least one R pixel and at least one B pixel makes it possible to reduce the presence of colored artifacts (aliasing) in the visible 2D image.

In the example shown, the rows of pixels PIX of the elementary group 3 all have as many Z pixels as R pixels. In addition, in said example, all the columns of pixels PIX of the elementary group 3 have as many Z pixels as R pixels.

In the example shown, all the rows of pixels PIX of elementary group 3 have the same number of G pixels. Furthermore, in said example, all the columns of pixels PIX of the elementary group 3 have the same number of G pixels. The number of G pixels in each row is e.g. equal to the number of G pixels in each column.

In the example illustrated in FIG. 2, each row of pixels PIX of the elementary group 3 includes twice as many G pixels as R pixels. Moreover, in said example, each column of pixels PIX of the elementary group 3 includes twice as many G pixels as R pixels.

In said example, the G pixels correspond to luminance pixels of the sensor 1. Luminance pixel refers to a pixel providing a predominant contribution to a luminance signal Y.

The R and B pixels correspond e.g. to chrominance pixels of the image sensor 1. Chrominance pixels refer to pixels used for obtaining a chrominance signal U, called the "blue difference", and another chrominance signal V, called the "red difference".

As defined by the present application, in the case of a sensor including N distinct types of 2D pixels, suitable for detecting light radiations in N distinct wavelength ranges, correspondingly centered on N distinct values of wavelengths $\lambda 1, \lambda 2, \ldots \lambda N$, with N, an integer greater than or equal to 3 and $\lambda 1 < \lambda 2 \ldots < \lambda N$, chrominance pixels refer to the two types of pixels having the two extreme wavelengths $\lambda 1$ and $\lambda N$, respectively, of the detection spectrum as central wavelength, and luminance pixels refer to the other type or types of 2D pixels, having as central wavelengths of sensitivity the intermediate wavelength or wavelengths $\lambda i$ of the detection spectrum, with i being an integer ranging from 2 to N−1.

The central wavelength is the wavelength at which the pixel exhibits maximum transmission in the visible spectrum.

For example, the G pixels, the filters of which are selectively transparent in the green region of the visible spectrum, are used to produce the luminance signal Y and the R and B pixels, the filters of which are selectively transparent in the red and blue regions, respectively, of the visible spectrum are used for producing chrominance signals V and U.

Figure 4:
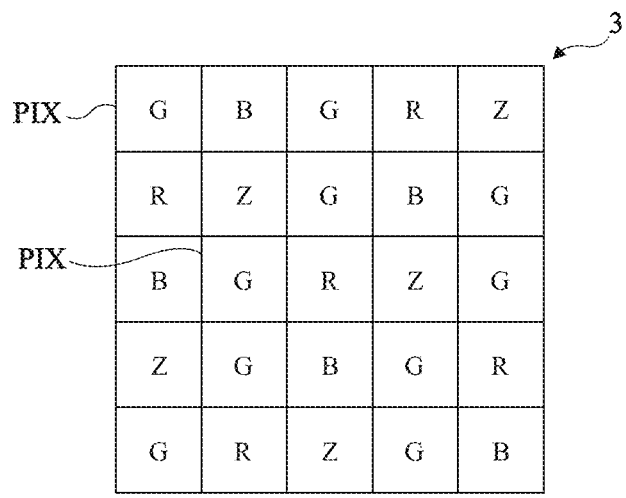
FIG. 4 is a top view schematically illustrating yet another embodiment of the elementary group of pixels of the image sensor of FIG. 1.

FIGS. 3 and 4 are top views schematically illustrating other embodiments of the elementary group 3 of pixels PIX of the image sensor 1.

The embodiments of the elementary group 3 illustrated in FIGS. 3 and 4 each have the same number of pixels PIX as in the example of FIG. 2, namely a matrix of 5×5 pixels PIX. The elementary groups 3 of FIGS. 3 and 4 each have a distribution of R, G, B and Z pixels, in rows and in columns of the matrix, identical to the distribution previously described in relation to FIG. 2.

In particular, the proportions of R. B. G and Z pixels per row and per column of the elementary group 3 of FIG. 3 and of the elementary group 3 of FIG. 4 are identical to the proportions of R, B, G and Z pixels per row and per column of the elementary group 3 of FIG. 2. The elementary groups 3 of FIGS. 3 and 4 differ from the elementary group 3 of FIG. 2 by the positioning of the R. G. B and Z pixels in each row and in each column.

In the embodiments described hereinabove in relation with FIGS. 2 to 4, each elementary group 3 includes exactly 5×5 pixels PIX, i.e. exactly five columns and exactly five rows of pixels PIX. Each row and each column of each of the elementary groups 3 of FIGS. 2 to 4 comprises only one Z pixel, only one B pixel, only one R pixel and two G pixels. Thereby, an optimum configuration is obtained for minimizing a number of calculations to be performed in order to reconstruct an image captured by the sensor 1. Each row and each column including exactly one Z pixel and one pixel of each chrominance channel (a single B pixel and a single R pixel), each depth and chrominance information is present only once on each row and on each column. Furthermore, each Z, R, B pixel is equidistant from four nearest neighboring pixels of the same type. Each Z, R, B pixel is more precisely separated from four neighboring Z, R, B pixels by a distance equal approximately to the pixel pitch (center-to-center distance between two pixels of the matrix of pixels of the image sensor 1) multiplied by √3. In the Fourier space, in this way it is possible to avoid repetition frequencies located at identical locations. A homogeneous distribution results therefrom, thereby preventing or reducing the appearance of aliasing effects on the image along the horizontal and vertical directions.

As a variant, provision can be made for replacing all or part of the luminance G pixels of the elementary group 3 by luminance W pixels of another type. Embodiments of such elementary groups are described hereinbelow in relation to FIGS. 5 to 8.

Figure 5:
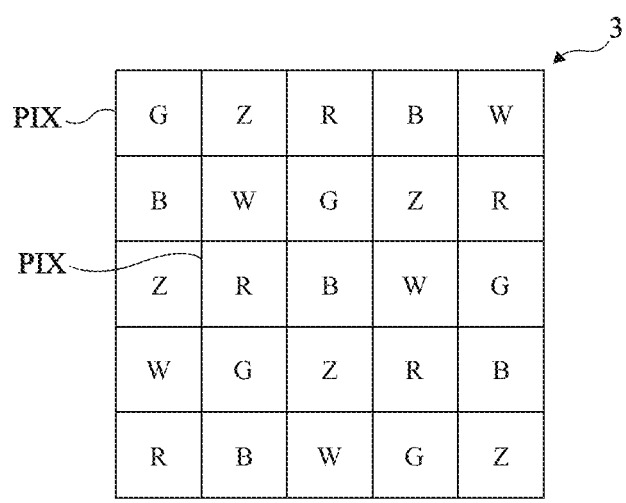
FIG. 5 is a top view schematically illustrating yet another embodiment of the elementary group of pixels of the image sensor of FIG. 1.

FIG. 5 is a top view schematically illustrating, yet another embodiment of the elementary group 3 of pixels PIX of the image sensor 1.

The example in FIG. 5 displays some elements in common with the example in FIG. 2. Such elements in common will not be described again hereinafter. The example illustrated in FIG. 5 differs from the example illustrated in FIG. 2 in that, in the example of FIG. 5, a part of the luminance G pixels of the 2D image are replaced by luminance W pixels of another type. The luminance W pixels are 2D image pixels and have e.g. a range of wavelengths with a different sensitivity from the sensitivity of the G pixels.

The W pixels are e.g. panchromatic, i.e. suitable for detecting light over a large part, or even over the whole, of the visible spectrum, e.g. between 400 and 700 nm. For this purpose, each 2D image W pixel includes e.g. a panchromatic filter. As a variant, the W pixels can be pixels predominantly sensitive to yellow light, or to emerald-green light. For this purpose, each 2D image W pixel includes e.g. a yellow or an emerald-green filter.

In the example shown, compared to the elementary group 3 of FIG. 2, one G pixel out of two is replaced by a W pixel. More precisely, half of the G pixels of each row, or half of the G pixels of each column, are e.g. substituted by a W pixel. In the example shown, each row includes as many W pixels as G pixels, and each column includes as many W pixels as G pixels.

As a variant, it is possible to provide for an elementary group wherein, compared to the elementary group 3 of FIG. 5, all the G pixels are substituted by W pixels and all the W pixels are substituted by G pixels.

Figure 6:
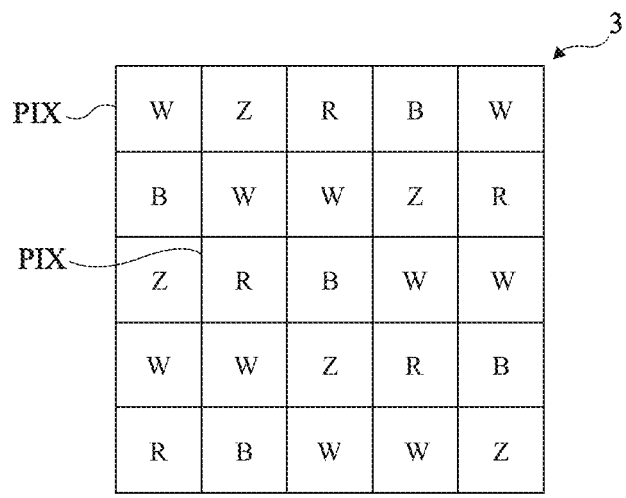
FIG. 6 is a top view schematically illustrating yet another embodiment of the elementary group of pixels of the image sensor of FIG. 1.

FIG. 6 is a top view schematically illustrating, yet another embodiment of the elementary group 3 of pixels PIX of the image sensor 1.

The example of FIG. 6 displays elements in common with the examples of FIGS. 2 and 5. Such elements in common will not be described again hereinafter. The example illustrated in FIG. 6 differs from the examples illustrated in FIGS. 2 and 5 in that, in the example of FIG. 6, all the luminance G pixels of the 2D image are replaced by luminance W pixels.

In said example, each row includes twice as many W pixels as Z, R or B pixels, and each column includes twice as many W pixels as Z, R or B pixels. More precisely, in the example illustrated in FIG. 6, each column includes exactly two W pixels, one Z pixel, one R pixel and one B pixel. Similarly, each row of the elementary group 3 of FIG. 6 includes exactly two W pixels, one Z pixel, one R pixel and one B pixel.

Figure 7:
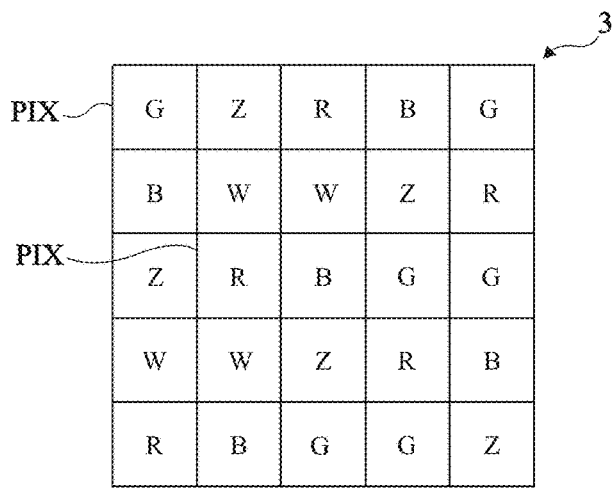
FIG. 7 is a top view schematically illustrating yet another embodiment of the elementary group of pixels of the image sensor of FIG. 1.

FIG. 7 is a top view schematically illustrating, yet another embodiment of the elementary group 3 of pixels PIX of the image sensor 1.

The example in FIG. 7 displays some elements in common with the example in FIG. 2. Such elements in common will not be described again hereinafter. The example illustrated in FIG. 7 differs from the example illustrated in FIG. 2 in that, in the example of FIG. 7, a part of the luminance G pixels of the 2D image are replaced by luminance W pixels.

In the example shown, compared to the elementary group 3 of FIG. 2, half of the G pixels are replaced by W pixels. More precisely, all the G pixels of every other row, e.g. all the G pixels belonging to even-numbered rows, are e.g. substituted by W pixels. In the example shown, compared to the elementary group 3 of FIG. 2, all the G pixels of the second and fourth rows of pixels PIX of the elementary group 3 are substituted by W pixels.

An advantage of the elementary group 3 of FIG. 7 compared with the group of FIG. 5 lies in the fact that the W pixels are grouped side by side in pairs, which can simplify the production thereof.

Figure 8:
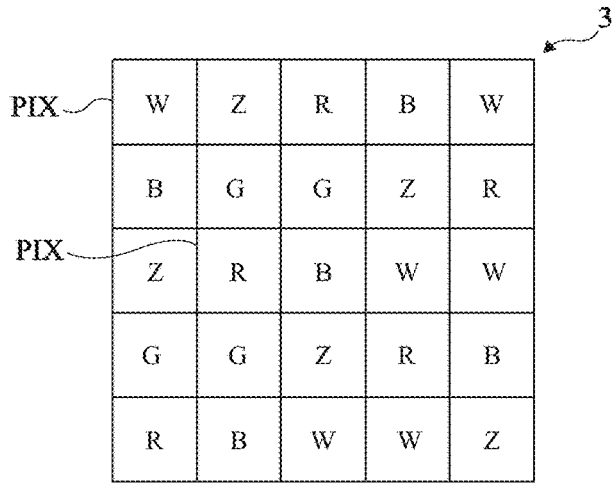
FIG. 8 is a top view schematically illustrating yet another embodiment of the elementary group of pixels of the image sensor of FIG. 1.

FIG. 8 is a top view schematically illustrating, yet another embodiment of the elementary group 3 of pixels PIX of the image sensor 1.

The example in FIG. 8 displays some elements in common with the example in FIG. 2. Such elements in common will not be described again hereinafter. The example illustrated in FIG. 8 differs from the example illustrated in FIG. 2 in that, in the example of FIG. 8, a part of the luminance G pixels of the 2D image are replaced by luminance W pixels.

In the example shown, compared to the elementary group 3 of FIG. 2, half of the G pixels are replaced by W pixels. More precisely, all the G pixels of every other row, e.g. all the G pixels belonging to odd-numbered rows, are e.g. substituted by W pixels. In the example shown, compared to the elementary group 3 of FIG. 2, all the G pixels of the first, third and fifth rows of pixels PIX of the elementary group 3 are substituted by W pixels.

Figure 9:
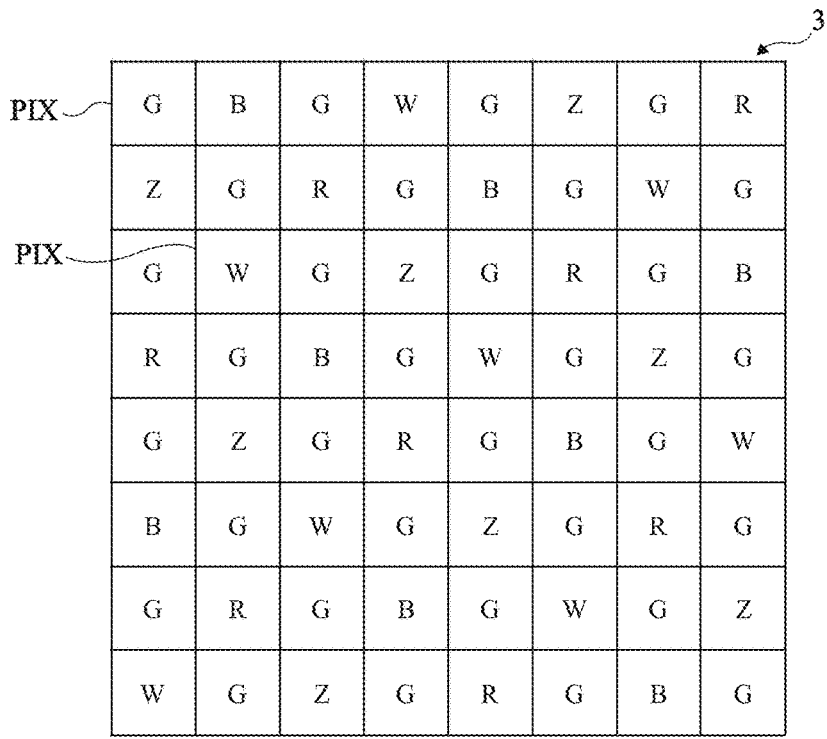
FIG. 9 is a top view schematically illustrating yet another embodiment of the elementary group of pixels of the image sensor of FIG. 1.

FIG. 9 is a top view schematically illustrating, yet another embodiment of the elementary group 3 of pixels PIX of the image sensor 1.

In the example shown, the elementary group 3 includes sixty-four pixels PIX distributed in eight rows and eight columns.

Compared to the elementary group 3 of FIG. 5, each row and each column of pixels PIX of the elementary group 3 of FIG. 9 includes three additional luminance pixels. In the example shown, the additional pixels are G pixels. As a variant, the additional pixels could be, at least in part, W pixels.

In the example shown, the elementary group 3 includes an alternation of diagonals of G pixels and diagonals of B. R. Z and W pixels.

An advantage of the examples of embodiments of the elementary groups 3 described in relation with FIGS. 2 to 9 lies in the fact that same enable the image sensor 1 to have a good colorimetric performance. Furthermore, the 2D images captured by the image sensor 1 have few color reconstruction artifacts such as aliasing.

More generally, in a preferred embodiment, each elementary group 3 of pixels is a square matrix of at least 5×5 pixels, wherein each row of pixels comprises at least one depth pixel, and preferentially a single depth pixel. Preferentially, each pixel column includes at least one depth pixel, and preferentially a single depth pixel. Preferably, all the rows and all the columns have the same number of chrominance pixels of each type. Chrominance pixels of one type, e.g. chrominance pixels having the lower wavelength $\lambda 1$ of the detection spectrum as the sensitivity central wavelength, are preferentially present on each row and on each column of the matrix, in the same quantity as the chrominance pixels of the other type, i.e. in said example, the chrominance pixels having as the sensitivity central wavelength thereof the upper wavelength AN of the detection spectrum. Preferentially, each row of the matrix of the elementary group 3 of pixels comprises two to four times more luminance pixels than chrominance pixels of each type. Moreover, each column of the matrix of the elementary group 3 of pixels preferentially comprises two to four times more luminance pixels than chrominance pixels of each type. Preferentially, all the rows and all the columns have the same number of luminance pixels of each type. Moreover, the number of depth pixels is preferentially equal, on each row and on each column, to the number of chrominance pixels of each type.

Such features provide increased colorimetric performance and reduced artifacts compared to known devices, in particular compared to known devices comprising 2D image pixels and depth pixels. Furthermore, in this way it is possible to obtain depth information having a satisfactory resolution for the applications targeted by the sensor 1.

Figure 10:
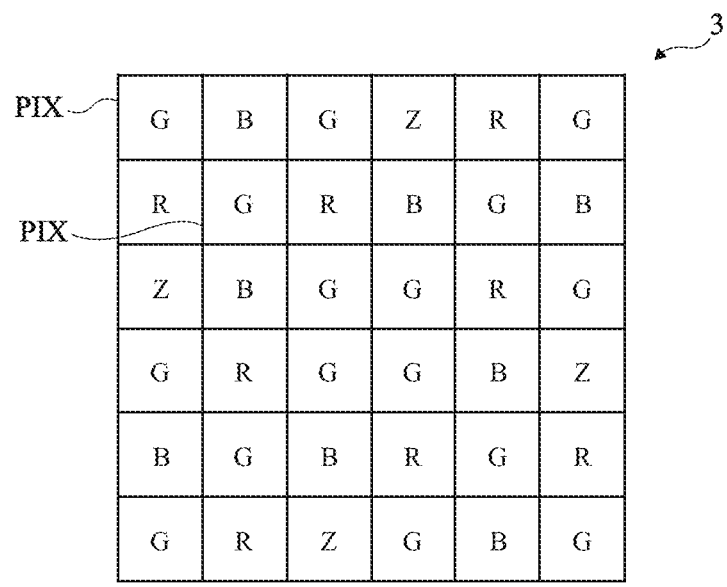
FIG. 10 is a top view schematically illustrating yet another embodiment of the elementary group of pixels of the image sensor of FIG. 1.

FIG. 10 is a top view schematically illustrating, yet another embodiment of the elementary group 3 of pixels PIX of the image sensor 1.

In the example shown, all the rows and all the columns of the elementary group 3 include at least one R pixel, one G pixel and one B pixel. Certain rows and certain columns do not have any Z pixels.

Figure 11:
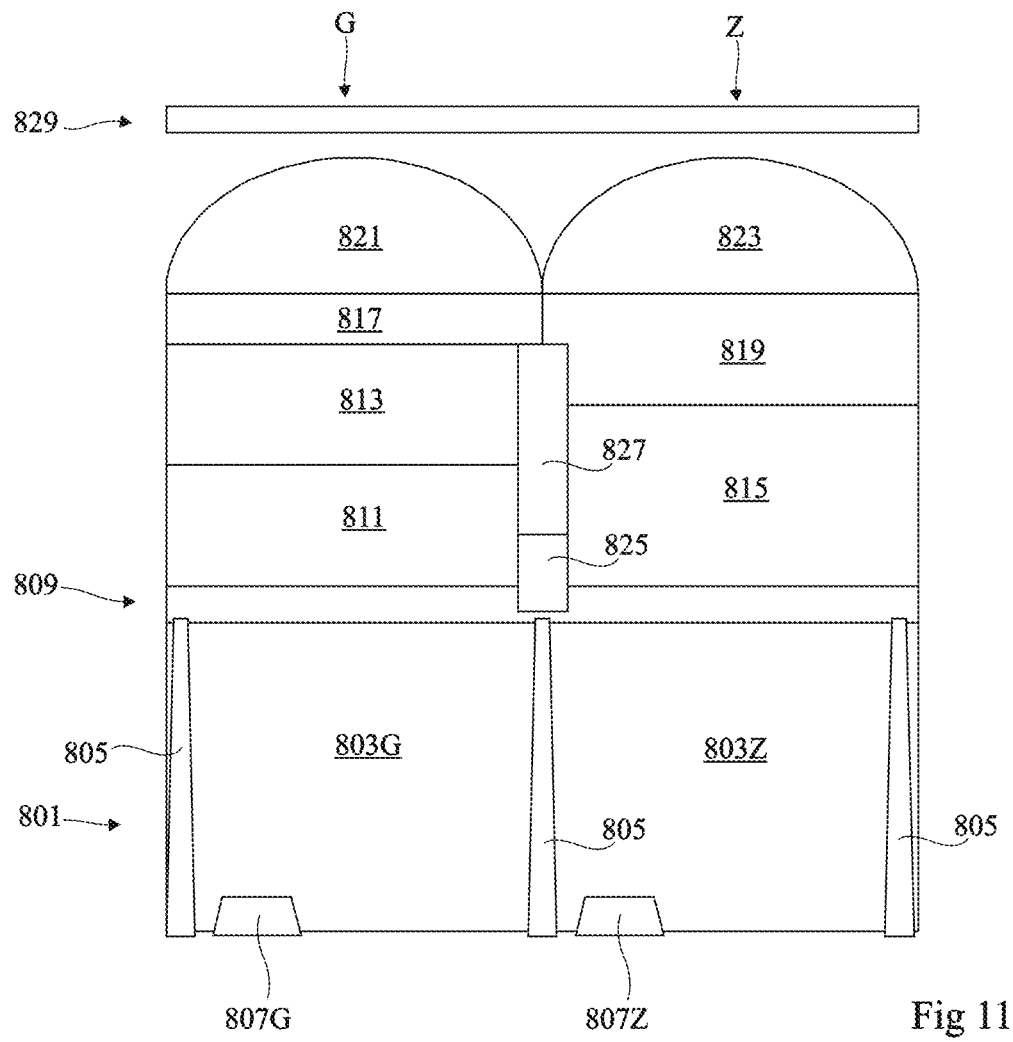
FIG. 11 is a sectional view schematically and partially illustrating a 2D image pixel and a depth pixel of the image sensor of FIG. 1.

FIG. 11 is a sectional view schematically and partially illustrating, a 2D image pixel, e.g. a G pixel, and a depth Z pixel of the image sensor 1.

In the example shown, the G pixels and Z are formed in and over a substrate 801. The substrate 801 is e.g. made of a semiconductor material, e.g. silicon.

Photosensitive zones are e.g. formed in the substrate 801. More precisely, in said example, a photosensitive zone 803G of the G pixel and a photosensitive zone 803Z of the Z pixel are formed in the substrate 801. The photosensitive zones 803G and 803Z, or photoconversion zones, are e.g. isolated from each other and with respect to the adjacent pixels, by isolation trenches 805. As an example, the isolation trenches 805 are Capacitive Deep Trench Isolation (CDTI) trenches.

In the example shown, regions 807G, 807Z for collecting the carriers photo-generated in the photosensitive zones 803G and 803Z, respectively, are formed in the substrate 801. In said example, the regions 807G and 807Z penetrate into the thickness of the photosensitive zones 803G and 803Z from a lower face of the zones 803G and 803Z. For example, the regions 807G and 807Z are N-type doped regions.

The regions 807G and 807Z are e.g. connected to control circuits located in substrate 801, although this is not shown in FIG. 11.

In the example shown, an upper face of the substrate 801 is coated with an anti-reflection layer 809. The layer 809 is used e.g. for optimizing the optical performance of the G and Z pixels.

In the example illustrated in FIG. 11, a color filter 811 covers a part of the upper face of the anti-reflection layer 809 situated directly above the photosensitive zone 803G of the G pixel. The color filter 811 is, in said example, a band-pass filter predominantly transmitting green light.

In the example shown, the color filter 811 is coated with a layer 813. The layer 813 is e.g. made of a resin transmitting visible light and absorbing radiation in the detection wavelength range of the Z pixel. As a variant, the resin layer 813 can be replaced by an interference filter. As a variant, provision can be made for the color filter 811 to coat the resin layer 813.

In the example illustrated in FIG. 11, an infrared filter 815 covers a part of the upper face of the anti-reflection layer 809 located directly above the photosensitive zone 803Z of the Z pixel. The infrared filter 815 is, in said example, a band-pass filter suitable for transmitting predominantly infrared radiation in the detection wavelength range of the Z pixel.

In the example shown, the upper face of the resin layer 813 and the upper face of the infrared filter 815 are coated with layers 817 and 819, respectively. Microlenses 821 and 823 are located over and in contact, respectively, with the upper face of layers 817 and 819.

The layers 817 and 819 can be used e.g. for compensating for differences in height between, on the one hand, a stack consisting of the color filter 811 and the layer 813 and, on the other hand, the layer 815. In this way it is possible, e.g. to obtain a flat surface before the production of microlenses 821 and 823.

In the example shown, the color filter 811 and the layer 813 are optically isolated from the filter 815 by a screen 825 and a vertical layer 827. As an example, the screen 825 is made of a metal, e.g. tungsten, and the layer 827 is made of a material having a refractive index lower than the refractive indices of the layers 811, 813 and 815.

In the example shown, a filter 829 is located above the microlenses 821 and 823. The filter 829 is e.g. a "double-band" filter, e.g. suitable for transmitting all or part of the visible spectrum and part of the infrared spectrum in the operation wavelength range of the Z pixel. As an example, the filter 829 lets through radiation over a first wavelength range between 350 and 650 nm and over a second wavelength range between 920 and 960 nm and cuts off radiation outside said ranges.

The R and B and if appropriate, W pixels of the sensor 1 can have a structure similar to the structure presented hereinabove in relation to the G pixel, the color filter 811 being adapted e.g. according to the type of pixel.

Various embodiments and variants have been described. Those skilled in the art will understand that certain features of these embodiments can be combined and other variants will readily occur to those skilled in the art. In particular, the R, G and B pixels which are predominantly sensitive in red, green and blue can be replaced by pixels which are sensitive to other colors, e.g. cyan, yellow and magenta.

Furthermore, although examples of applications have been described hereinabove wherein the depth pixels of the image sensor are suitable for measuring distance by time-of-flight, the embodiments are more generally transposable to image sensors comprising any type of pixel which can provide depth information, e.g. structured light acquisition pixels, Single Photon Avalanche Diodes (SPAD), etc.

Finally, the practical implementation of the embodiments and variants described herein is within the capabilities of those skilled in the art based on the functional description provided hereinabove.

The invention claimed is:

1. An image sensor comprising a plurality of pixels divided in elementary groups of 5×5 pixels, each elementary group consisting of a plurality of adjacent pixels arranged in a matrix, in rows and columns, each row and each column of each elementary group including exactly:
a first visible image pixel predominantly sensitive to red light;

a second visible image pixel predominantly sensitive to blue light;

two third luminance pixels; and a fourth depth image pixel.

2. The sensor according to claim 1, wherein all third pixels are predominantly sensitive to green light.

3. The sensor according to claim 1, wherein all third pixels are predominantly sensitive to white, yellow or emerald-green light.

4. The sensor according to claim 1, wherein the third pixels include pixels of a first type and pixels of a second type sensitive in different wavelength ranges.

5. The sensor according to claim 4, wherein:

the third pixels of the first type are predominantly sensitive to green light; and the third pixels of the second type are predominantly sensitive to white, yellow or emerald-green light.

6. The sensor according to claim 4, wherein each elementary group has as many third pixels of the first type as third pixels of the second type.

7. The sensor according to claim 6, wherein, within each group of pixels, all rows and columns have an equal number of third pixels of the first type and of third pixels of the second type.

8. The sensor according to claim 6, wherein, within each group of pixels, the third pixels of every other row are all of the first type, the third pixels of the other rows being all of the second type.

9. The sensor according to claim 1, wherein the fourth pixel is a pixel for measuring distance by time-of-flight.

* * * * *